US012483394B1

(12) United States Patent
Martinez et al.

(10) Patent No.: US 12,483,394 B1
(45) Date of Patent: Nov. 25, 2025

(54) PERFORMING ENCRYPTION SERVICES USING COMBINATORIAL ANALYSIS OF EVENT DATA AND IOT DEVICE DATA

(71) Applicant: United Services Automobile Association (USAA), San Antonio, TX (US)

(72) Inventors: Noe Alberto Martinez, San Antonio, TX (US); Marta Leigh Argumedo, Helotes, TX (US); Jose L. Romero, Jr., San Antonio, TX (US); Andre Rene Buentello, San Antonio, TX (US); Paula Ann Whittington, Helotes, TX (US); Desmond Montrell Savage, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 253 days.

(21) Appl. No.: 18/097,041

(22) Filed: Jan. 13, 2023

(51) Int. Cl.
*H04L 9/08* (2006.01)
*G06N 10/40* (2022.01)

(52) U.S. Cl.
CPC .......... *H04L 9/0852* (2013.01); *G06N 10/40* (2022.01)

(58) Field of Classification Search
CPC ..... H04L 9/0852; H04L 63/08; H04L 63/083; H04L 63/10; H04L 63/107; H04L 63/126; G06N 10/40
See application file for complete search history.

(56) References Cited

U.S. PATENT DOCUMENTS

| | | | | |
|---|---|---|---|---|
| 8,781,129 B2* | 7/2014 | Bush | ..................... | H04L 9/0852 |
| | | | | 380/278 |
| 11,218,472 B2* | 1/2022 | Rosenblatt | ............ | H04L 9/0852 |
| 11,258,602 B2* | 2/2022 | Daly | ..................... | H04L 9/0866 |
| 11,271,911 B2* | 3/2022 | Daly | ..................... | H04L 9/3228 |
| 11,343,089 B2* | 5/2022 | Edwards | ............... | H04L 9/0861 |
| 11,477,016 B1* | 10/2022 | Carter, Jr. | ............. | G06F 21/577 |
| 12,073,378 B2* | 8/2024 | Keith, Jr. | ............... | G07G 1/009 |
| 12,170,725 B2* | 12/2024 | Trost | ..................... | H04L 9/0852 |
| 12,219,058 B1* | 2/2025 | Rao | ......................... | H04L 9/0852 |

* cited by examiner

Primary Examiner — Hosuk Song
(74) Attorney, Agent, or Firm — Fletcher Yoder, PC

(57) ABSTRACT

A method may include receiving, via at least one qubit processor, input data comprising user location data associated with one or more locations of a user over a period of time and Internet-of-Things (IoT) data associated with the user. The method may then involve generating a quantum encryption model based on the input data. The quantum encryption model may apply encryption algorithms to subsets of the input data in superposition. Each subset may include at least one combination of at least a portion of the user location data and at least a portion of the IoT data. The method may then involve receiving dynamic input data that may include updated user location data and updated IoT data acquired after the input data, determining a dynamic password based on the quantum encryption model and the dynamic input data, and sending a notification including the dynamic password to a user device.

20 Claims, 4 Drawing Sheets

PERFORMING ENCRYPTION SERVICES USING COMBINATORIAL ANALYSIS OF EVENT DATA AND IOT DEVICE DATA

BACKGROUND

The present disclosure is related to providing notification and alert services based on event data and internet-of-things (IOT) data. More specifically, the present disclosure is related to performing combinatorial analysis using quantum computing systems to efficiently generate encrypted codes or provide alerts of suspected fraud.

As password security and multi-factor authentication processes become more prevalent, computing resources become more strained to perform the associated computational tasks to generate encrypted or dynamic passwords. Moreover, detecting fraudulent activity in financial transactions may also involve inefficient computer processing that may delay the expediency of performing the transaction. Accordingly, improved systems and processes for generating passwords and detecting potential fraud in financial transactions while using less computing resources may be useful.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, A method may include receiving, via at least one qubit processor, input data comprising user location data associated with one or more locations of a user over a period of time and Internet-of-Things (IoT) data associated with the user. The method may then involve generating a quantum encryption model based on the input data. The quantum encryption model may apply encryption algorithms to subsets of the input data in superposition. Each subset may include at least one combination of at least a portion of the user location data and at least a portion of the IoT data. The method may then involve receiving dynamic input data that may include updated user location data and updated IoT data acquired after the input data, determining a dynamic password based on the quantum encryption model and the dynamic input data, and sending a notification including the dynamic password to a user device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
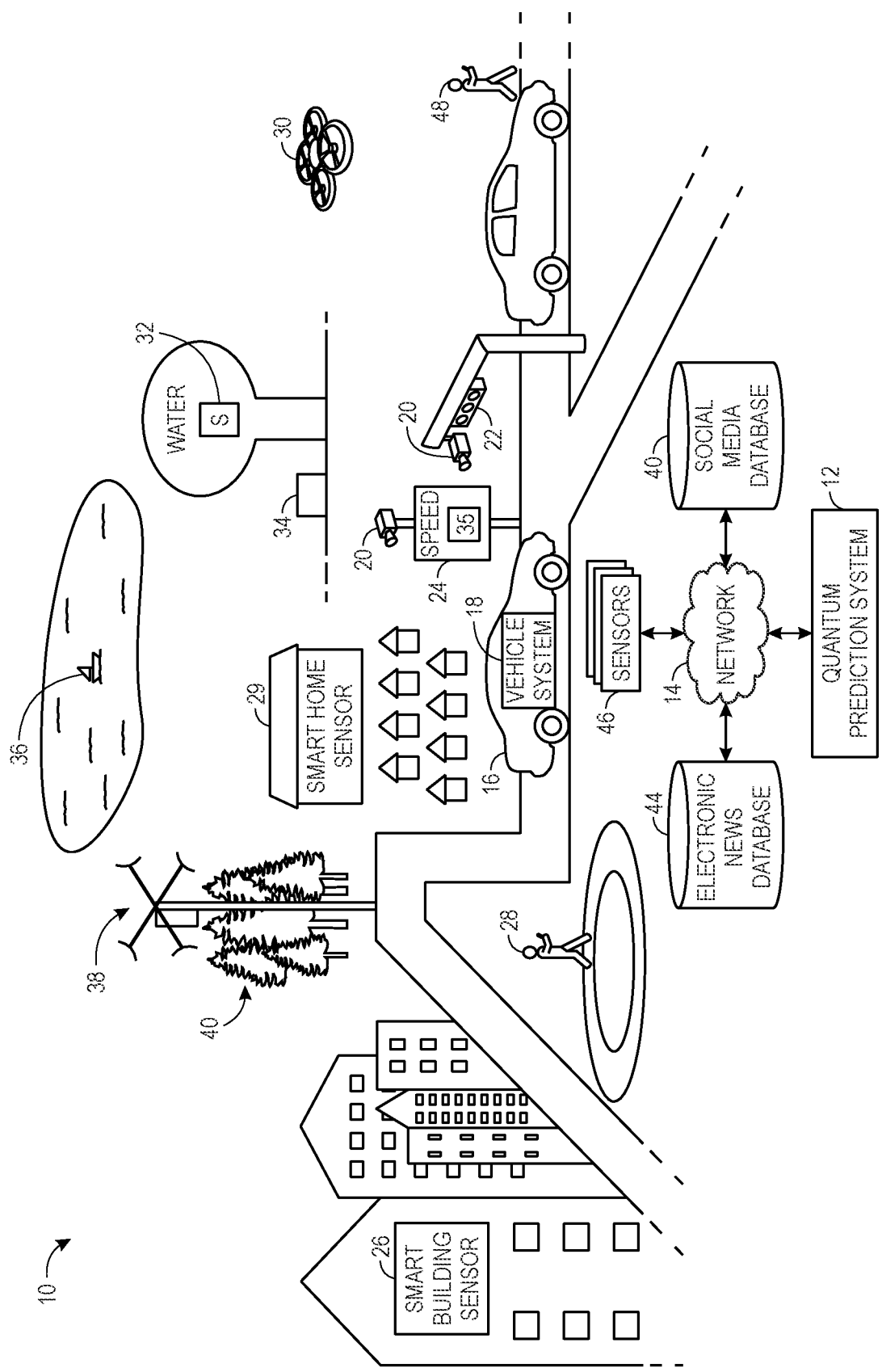
FIG. 1 is a diagram of a system including a variety of data sources that may be provided to a quantum computing prediction system to perform combinatorial analysis, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, authentication or encryption processes may be increasingly computationally resource intensive as the encryption schemes become more complex. However, as hackers become even more resourceful at intercepting and deciphering various passwords or passcodes, it becomes increasingly important to employ these robust encryption schemes. With this in mind, the present embodiments disclosed herein may use location data associated with a user in combination with additional data acquired from internet-of-things (IoT) devices to generate and update encryption models that perform certain encryption processes based on the combination of the location data and the additional data acquired by IoT devices. The encryption model pre-process or pre-determine a password that is based on a relationship between the location data and the IoT data using some encryption algorithm or methodology. The IoT data may include data from any suitable device including a home assistant device, a smart vehicle, a biometric sensor, and the like, such that the data may be applied to an encryption algorithm or password generator along with the location data. In this way, a unique password may be predetermined for various combinations of user locations and other data sources.

After the encryption model is generated, a user may send a request from a user device to a secure device, such as an automated teller machine (ATM) device, to perform a transaction or operation. Before performing the transaction, the secure device may request a password or some authentication data from the user. In some embodiments, the user device may query the encryption model based on the current location data of the user and any relevant IoT data (e.g., vehicle location data, vehicle use data, previous input to smart home device) to retrieve a password. After retrieving the password, the user device may display the password for the user to input the password into the secure device or send the password directly (e.g., wireless) to the secure device. The secure device may use the same data inputs to query the same encryption model that may be stored in a common storage component accessible to the secure device and the user device. In this way, the secure device may verify whether the password received via user input or from the user device is accurate. Moreover, since the encryption model includes passwords for various combinations of user location data and IoT data, the retrieved password may be unique for different visits to the same secure device, thereby making the password more robust and difficult for hackers to determine.

As may be appreciated, to efficiently preprocess and generate or update the encryption model, a quantum computing system may be employed to perform the combinatorial analysis described above. Indeed, the number of data sources that provide the IoT data may vary over time. Further, the volume of data provided to the quantum computing system to analyze in combination with the location data may overwhelm other computing systems. However, since the quantum computing system operates using quantum mechanics and qubits, the data acquired from various data sources may be evaluated simultaneously with the location data to perform various types of encryption algorithms in an efficient matter. That is, the quantum computing system may evaluate the various sources of data in a variety of states (e.g., conditions present or not present) in superposition (e.g., conditions present and not present at the same time) to update the encryption model in real time and output a unique password in an efficient manner.

Indeed, as advances continue in the quantum computing field, quantum computers with processors equipped with over 100 qubits are capable of performing different types of combinatorial analysis for various types of problems. That is, these quantum computers can represent each individual input variable in a multidimensional space as a one bit, a zero bit, and as both: a one bit and a zero bit at the same time or simultaneously. As a result, these quantum computers may employ quantum wave interference to simultaneously analyze a number of input variables relevant to a combinatorial optimization problem to find an optimal (e.g., highest probability of success) solution to the problem. In this way, performing combinatorial analysis that may involve a significant amount of computing resources by a classical supercomputer may be performed using less resources in a more efficient manner via a quantum computer.

With the foregoing in mind, a quantum model may be generated to represent a plurality of solutions to a combinatorial optimization problem by simultaneously evaluating a plurality of input variable states. The quantum model may thus enable users to have vast improvements in cryptography, data analytics, forecasting, pattern matching, and so forth. Indeed, after a particular input variable state of the quantum model is observed or measured by an individual considering the problem, the quantum model may immediately yield a solution for the optimization problem because the quantum model has already computed all of the solutions, thereby enabling additional processes or services to be initiated in an efficient amount of time. For instance, after receiving the user location data and the IoT data associated with the user, a quantum encryption model for passwords may be generated to represent a plurality of solutions for the user while the user is located in a particular position and having corresponding situations or scenarios present, as determined based on the IoT data. The plurality of solutions may be filtered to identify a subset of solutions that have the highest probabilities of being accurate. As more data is collected into the quantum model, the subset of solutions may converge to a small set of solutions that may be presented to the user.

In addition to using the quantum computing system to generate passwords, the present embodiments also describe sending fraud alerts in response to detecting that the user is likely being coerced or their devices are being used by others. That is, the quantum computing system may evaluate certain transaction requests in view of expected IoT data that may be part of the quantum encryption model. If the expected IoT data is not present, the quantum computing system may send a fraud alert or prevent a transaction from being performed. Additional details with regard to generating dynamic passwords and sending fraud alerts using combinatorial analysis of IoT data will be discussed below with reference to FIGS. 1-7.

By way of introduction, FIG. 1 illustrates a diagram of a system (e.g., a smart city) 10 that includes a variety of data sources to assist a quantum computing system 12, according to an embodiment of the present disclosure. Referring to FIG. 1, the system 10 may include a network 14 that may receive relevant data from the variety of data sources and transmit the data received from the data sources to the quantum computing system 12. As will be discussed in greater detail below, the quantum computing system 12 may simultaneously process the relevant data using quantum computing operations to efficiently account for multiple datasets to perform certain tasks, such as encryption processes or data analysis. Moreover, the quantum computing system 12 may, in some embodiments, generate a coordinated set of instructions to various devices (e.g., sprinklers, drones, dams) to modify operations in conjunction with each other to assist individuals in view of the results of the analysis.

The network 14 may receive data regarding operations, location, and other properties related to vehicles 16 via vehicle systems 18. For example, the vehicle system 18 may include speed data or location data, which the quantum computing system 12 may use to collect various types of data (e.g., temperature, occupancy, traffic) in the area at a given moment. In certain embodiments, the vehicle 16 may include a video system (e.g., image and audio sensors that collect image and audio data), which may capture real-time area data (e.g., vehicle traffic in the area, pedestrian traffic in the area, weather conditions) at a street level and send the captured data to the quantum computing prediction system 12. In some embodiments, the video system may include an image sensor or any suitable a camera to capture real-time image data.

The system 10 may also include the cameras 20 that may be affixed to a traffic light 22 or a speed detector 24. The traffic light 22 (or traffic sign, or dedicated data collection device like a traffic collection tower) and the speed detector 24 may send collected data to the quantum computing prediction system 12 via the network 14 or any other suitable communication protocol. For example, the traffic light 22 may send data regarding the number of vehicles 16 passing the traffic light 22. The traffic light 22 may also receive commands (e.g., from the quantum computing prediction system 12) causing the traffic light 22 to turn red, yellow, green, flash yellow, flash red, and so on.

The speed detector 24 may send data to the quantum computing system 12 regarding the posted speed limit in the area, and the speed detector 24 may receive commands (e.g., from the quantum computing prediction system 12) causing the speed detector 24 to dynamically change the posted speed limit of the area (e.g., to slow the traffic in the area to facilitate an emergency response). While traffic lights are discussed, it should be noted that any controllable assets (e.g., electronic buoys, or other markers or indicators that may be disposed within or alongside a waterway, air traffic control lights, and so on) may be employed in the embodiments described herein.

The quantum computing system 12 may collect, via the network 14, data from building sensors 26. The building sensors 26 may be coupled to structures (e.g., buildings, bridges, roads, and so on). The building sensors 26 may include a vibration sensor, a seismometer, a seismograph (e.g., to detect and record seismic events, volcanic activity, explosions, collisions, falling objects, etc.), water level sensors, humidity sensors, heat sensors, infrared sensors, or any other appropriate sensor that may provide information related to the ambient environment within or outside a building. For example, a water sensor may be used to determine flooding on a street including depth and force/speed, while heat sensors and/or infrared sensors may assist in locating a fire, determining where the fire may have originated, determining in which direction the fire is traveling, and so on.

The quantum computing system 12 may also collect data from and/or about individuals in the area. For example, the individuals may be wearing wearable devices 28 that may include medical, biometric and/or location tracking devices. The quantum computing prediction system 12 may track the location and health of the individuals via the wearable devices 28, which may provide information related to the presence of individuals in various locations.

Additionally, the quantum computing prediction system 12 may receive data from smart home sensors 29. The smart home sensors 29 may include devices that may be positioned in a home or building and may be connected to a network. The smart home sensors 29 may include contact sensors that detect a position of door or other physical component, motion sensors that track movement of objects, vibration sensors, sound sensors that detect noise, water sensors that detect the presence of water or liquid in a location, temperature/humidity sensors, light (e.g., ultraviolet, infrared) sensors, smoke/carbon dioxide/gas sensors, electricity usage sensors, and the like. The smart home sensors 29 may also include devices that perform certain home automation operations. The devices may include smart plug-in devices that control the flow of electricity to connected devices, smart doorbells that track movement outside of the home and doorbell usages, security cameras that record objects present in its view under various conditions, smart thermostats that may control the heating and air conditioning systems, smart appliances (e.g., refrigerator, vacuum cleaner) that perform specific operations, smart assistant devices that respond to audio commands, listen to ambient noises that may be present, and control operations of connected devices, smart light fixtures, smart plumbing devices, and the like.

In addition to the devices described above, in some embodiments, drones 30 (e.g., unmanned aerial vehicles) may be employed to collect traffic data, image data, and the like. The drones 30 may be ground-based drones that traverse roads and different terrains via the air or surface to collect various types of data. In some situations, the drones may be waterborne. Other drones might traverse fluid pipes, gas pipes, drainage pipes, chimneys, caves, service tunnels, crawl spaces, attics, basements, parking garages, subways, etc. In this way, the drones may be positioned in the area and provide data to the quantum computing prediction system 12 or other suitable device to perform the embodiments described herein.

The system 10 may also include a water tower sensor 32 that may detect water level in a water tower that provides clean water to residents of a city or area. The water tower sensor 32 be communicatively coupled to a water pump 34 that may pump water to various destination ports or from the water tower.

A smart buoy 36 may provide information related to a body of water, such as reservoir, river, lake, drainage area, or the like. The smart buoy 36 may detect a water level, wind speed, water temperature, water acidity level, and other properties related to a body of water.

In some embodiments, a wind sensor 38 may detect a wind speed, air quality properties (e.g., carbon monoxide, acid gases, smoke properties), and the like. One or more wind sensors 38 may be positioned at various locations within the system 10. In some cases, the wind sensor 38 may be positioned in a forest area 40 or other wooded area to track wind patterns. Based on the measurements from the wind sensor 38 in the forest area 40, the quantum computing system 12 may track or predict paths for forest fires or other nuisances that may be influenced by the wind.

Additional data may be acquired by smart mobile devices 48 owned and carried by individuals. The smart mobile devices 48 may include any suitable device that may communicate data with the network 14. As such, the smart mobile device 48 may include smart phones, smart watches, network-enabled tablet devices, and the like. The smart mobile devices 48 may include location services that track a location of the respective device. In addition, the smart mobile devices 48 may send datasets, commands, and other signals to other devices.

As mentioned above, the quantum computing system 12 may be communicatively coupled to the sensors and devices described above via the network 14 or some suitable communication protocol. In addition, relevant data may also be gathered from social media database 42. Using web crawlers or other web monitoring tools, the quantum computing prediction system 12 may track or receive information related to area data (e.g., regarding traffic), event data (e.g., text-based social media posts, pictures, videos of weather events, seismic events, conflagrations), or emergency resource data (e.g., text-based social media posts, pictures, videos of emergency responders). The social media database 42 may include data available via social media sites such as Facebook®, Twitter®, and the like. In one embodiment, the social media database 42 may include information associated with the individuals, businesses, organizations, governmental agencies, news outlets, and the like. For example, the data of the social media database 42 may be associated with the location of a user or a destination of the user. The social media database 42 may also include data trending on social media sites that may not be directly associated with any particular measurement described above. However, the trending data may provide the quantum computing prediction system 12 additional data that may be related to the data collected from the sources described above. For instance, the data from the social media database 42 may include information regarding a natural phenomenon or any disruptive situation and may be correlated or verified with data acquired from the sensors or devices mentioned above or other suitable devices and sensors.

Additionally, the system 10 may include an electronic news database 44, which may include information provided by various news services that may be updated in real-time or near real time via a network (e.g., Internet). The electronic news database 44 may provide information regarding weather alerts, natural phenomenon alerts, non-natural phenomenon alerts (e.g., traffic, active shooter), and any other information that may be published via an electronic news outlet such as a webpage, news database, or the like. As such, the quantum computing system 12 may become aware of the likelihood of a disruptive event affecting a certain area.

In addition to the data sources mentioned above, the quantum computing prediction system 12 may collect data from a wide variety of sensors 46. The sensors 46 may include any type of device capable of detecting location, moisture, temperature, light, and the like. One or more sensors 46 may be disposed on different types of property such as an individual, a home, a vehicle, and the like. In certain embodiments, one or more sensors 46 may be disposed within certain rooms of the home, outside the home, within the vehicle, or outside the vehicle. The sensors 46 may also be disposed on devices carried by or worn by individuals. For example, the sensors 46 may be disposed on mobile phones, wearable electronics, and the like. In one embodiment, the sensors 46 may provide location information regarding the sensors 46. As such, the sensors 46 may provide global positioning system (GPS) coordinates and the like to indicate a location of the sensors 46.

In some embodiments, secure devices, such as automatic teller machine (ATM) devices 50, may request authentication data from a user before performing a transaction. The ATM device 50, for example, may request a password, a code, a pin, or other suitable input prior to dispensing cash. As mentioned above, the quantum computing system 12 may retrieve a unique password from an encryption model or a quantum encryption model based on the sensor data and IoT data described above. It should be noted that the IoT data may include any suitable data provided by a device that is communicatively coupled to the network 14.

Figure 2:
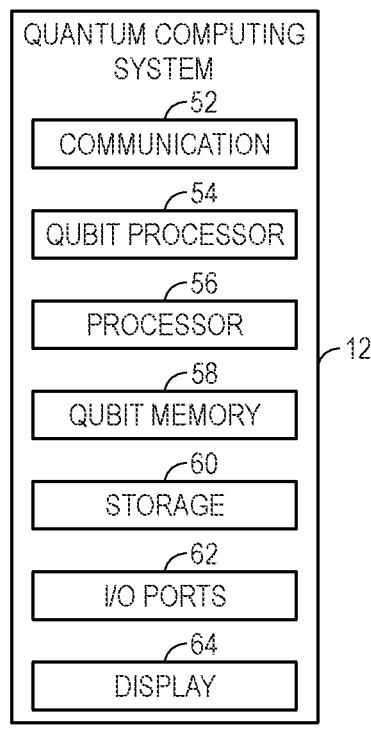
FIG. 2 is a block diagram of example components within the quantum computing prediction system, in accordance with aspects of the present disclosure.

The quantum computing system 12 may use the collected data for additional analysis in accordance with the embodiments presented herein. Before describing the analysis operations, FIG. 2 is a block diagram of example components that may be part of the quantum computing system 12, according to an embodiment of the present disclosure. Although the following description details some example components that make up the quantum computing system 12, it should be understood that the quantum computing system 12 may include additional or fewer components.

Referring now to FIG. 2, the quantum computing system 12 may include a communication component 52, a qubit processor 54, a host processor 56, a qubit memory 58, a storage 60, input/output (I/O) ports 62, a display 64, and the like. The communication component 52 may be a wireless or wired communication component that may facilitate communication between the quantum computing prediction system 12, various types of devices, the network 14, and the like. Additionally, the communication component 52 may facilitate data transfer to the quantum computing system 12, such that the quantum computing system 12 may receive data from the other components depicted in FIG. 1 and the like.

The qubit processor 54 may be any type of quantum processing unit (QPU) that provides a computational unit that relies on quantum principles to perform a task. In some embodiments, the qubit processor may include a qubit random access memory that includes registers and gates, a quantum control unit that drives qubits to desired states, and a classical control interface that can facilitate interactions between the host processor 56 capable of executing computer-executable code to instruct the qubit processor 54 to perform certain analysis operations (e.g., combinatorial analysis). The processor 56 may also include multiple processors that may perform the operations described below.

The qubit memory 58 may include one or more qubits that make up basic units of quantum memory. Each qubit may be either a 0, 1, or both 0 and 1 via superposition. As such, an 8-qubit memory may represent all numbers 0 through 255 at the same time. The qubits may be realized using a variety of approaches including photonics, trapped ions, semiconductors, superconducting material, and the like.

The storage 60 may be any suitable articles of manufacture that can serve as media to store processor-executable code, data, or the like. These articles of manufacture may represent computer-readable media (e.g., any suitable form of memory or storage) that may store the processor-executable code used by the qubit processor 54, the processor 56, or both to perform the presently disclosed techniques. The storage 60 may also be used to store data, various other software applications for analyzing the data, and the like. The storage 60 may represent non-transitory computer-readable media (e.g., any suitable form of memory or storage) that may store the processor-executable code used by the qubit processor 54, the processor 56, or both to perform various techniques described herein. It should be noted that non-transitory merely indicates that the media is tangible and not a signal.

The I/O ports 62 may be interfaces that may couple to other peripheral components such as input devices (e.g., keyboard, mouse), sensors, input/output (I/O) modules, and the like. The display 64 may operate to depict a representation of the 3D AR or VR visualizations associated with software or executable code being processed by the qubit processor 54, the processor 56, or both. In one embodiment, the display 64 may be a touch display capable of receiving inputs from a user of the quantum computing prediction system 12.

It should be noted that the components described above with regard to the quantum computing system 12 are exemplary components and the quantum computing system 12 may include additional or fewer components as shown. In addition, although the components are described as being part of the quantum prediction system 12, the components may also be part of any suitable computing device described herein such as the vehicle system 18, the speed detector (e.g., speedometer) 24, the traffic light 22, the sensors 46, and the like to perform the various operations described herein.

Figure 3:
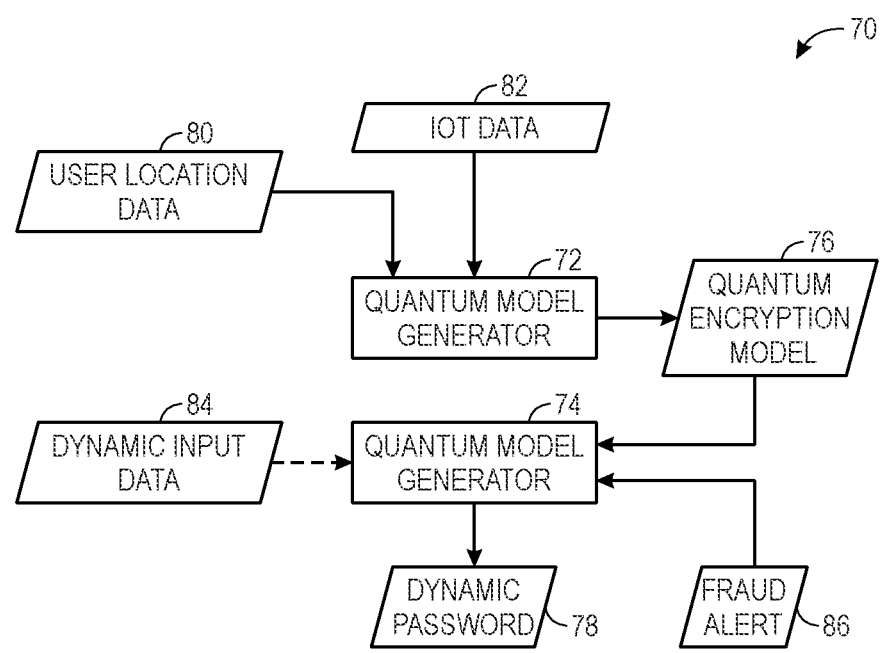
FIG. 3 is a data flowchart of a method for generating and updating quantum encryption models using static and dynamic data sources, in accordance with aspects of the present disclosure.

Keeping this in mind, FIG. 3 illustrates a data flowchart 70 for performing combinatorial analysis described herein using quantum computing techniques. For instance, the quantum computing prediction system 12 may include a quantum model generator 72 and a solution filter system 74 to produce a quantum encryption model 76 and a dynamic password 78 or a fraud alert 86 to a particular event in accordance with embodiments described herein.

Referring now to FIG. 3, user location data 80 may include data related to a physical location of an individual or entity at a particular time or time period. As such, the user location data 80 may include data acquired from any suitable data source described above with reference to FIG. 1 that provides information related to a location of a user. For instance, location data for a user may be provided by the sensors 46, the smart mobile devices 48, and the like.

In addition to the user location data 80, the quantum model generator 72 may also receive Internet-of-Things (IoT) data 82, which may correspond to various types of data that may be received from suitable devices in the system 10 and may be evaluated in conjunction with the user location data 80. The IoT data 82 may include various types of data, such as the use or measurement of the smart building sensor 26, the smart home sensor 29, the vehicle system 18, the camera 20, the traffic light 22, and the like. The IoT data 82 may be defined for or associated with various locations within a geographic area with respect to the user location data 80. For example, the user may routinely perform a phone call using the vehicle system 18 or the smart mobile device 48 while the user location data is in a particular area. In the same manner, the speed detector 24 may routinely detect that the vehicle 16 travels at a particular speed range when the user location data corresponds to a particular area. As may be appreciated, the IoT data 82 in conjunction with the user location data 80 may be associated with each other with respect to certain patterns or the like. That is, the user location data 80 may be correlated to the IoT data 82 to determine pattern data or expected user data for the user. The expected user data may be captured or observed over time to identify routine or expected behaviors.

After receiving the user location data 80 and the IoT data 82, the quantum model generator 72 may determine a password or perform an encryption process based on the user location data 80 and the IoT data 82. For instance, the quantum model generator 72 may cross correlate the user location data 80 and the IoT data 82 for each different observed combination. The cross correlation may include applying the user location data 80 and the IoT data 82 to some function that may include encryption algorithms or the like. By employing the quantum computing system 12, the quantum model generator 72 may simultaneously perform a number of different analyses for the different combinations of the user location data 80 and the IoT data 82 in superposition. With this in mind, the quantum model generator 72 may generate the quantum encryption model 76 that determines each solution of the encryption algorithm based on each combination of the user location data 80 and the IoT data 82 in superposition. That is, the quantum encryption model 76 may be stored in the qubit memory 58 as a model that calculates or generates a password for each of the previously detected IoT data 82 with respect to each corresponding position provided within the user location data 80 simultaneously.

By way of operation, the quantum model generator 72 may simultaneously determines the passwords based on the user location data 80 and the IoT data. As such, the quantum encryption model 76 may include expected passwords for each independent combination scenario with respect to the properties associated with the user location data 80 and the IoT data 82. In this way, the quantum encryption model 76 may provide a plurality of expected passwords, as determined using a respective encryption algorithm, for the various scenarios provided in the IoT data 82 for the user location data 80, which may correspond to a particular period of time. That is, the user location data 80 may be collected at periodic intervals and the quantum encryption model 86 may be updated accordingly.

Keeping this in mind, although the quantum encryption model 76 determines the plurality of passwords for each combination of the user location data 80 and the IoT data 82 simultaneously, none of the expected passwords are observed within the quantum encryption model 76. Instead, each expected outcome of the quantum encryption model 76 exists in superposition with each other at the same time. That is, the quantum computing system 12 has determined each of the expected passwords for each combination scenario at the same time. In other words, the quantum model generator 72 receives the input data (e.g., user location data 80, IoT data 82) and determines all of the password solutions or expected outcomes in superposition. As a result, a quantum encryption model 76 evaluates all of the input conditions at the same time (e.g., in superposition).

To glean or determine a subset of the expected outcomes or the appropriate password solution, the quantum encryption model 76 is provided to the solution filter system 74, which may filter the least likely expected outcomes or the expected outcomes that have less than some threshold probability of occurring. The solution filter system 74 may sweep away less likely solutions without observing the expected outcomes of the quantum encryption model 76 by applying a quantum search algorithm that may be used for unstructured searches. In some embodiments, the quantum search algorithm may include Grover's algorithm, which may identify the expected outcome for each password that has a probability of occurring that is greater than some upper threshold. As such, the resulting event analysis solution 78 may provide a collection of expected passwords for given scenarios, such that the quantum computing system 12 may efficiently generate the password as compared to other computing systems that may have to perform the encryption algorithm using the user location data 80 and the IoT data 82. In some embodiments, based on the expected outcomes provided in the event analysis solution 78, the quantum computing prediction system 12 may send the dynamic password 78 to the smart mobile device 48 or other suitable device accessible to the user. The quantum computing prediction system 12 may also send a fraud alert 86 if the expected conditions for a request is not present, as will be discussed in further detail with reference to FIGS. 6 and 7. In some embodiments, the notifications may be provided to individuals or devices described in FIG. 1 to notify the individuals or adjust operations of devices in view of the provided data. In this way, devices may react more quickly after the user data authenticated or verified as being authentic (e.g., not fraudulent).

Although the dynamic password 78 and the fraud alert 86 may be output due to these results corresponding to the highest likely expected outcomes of the quantum encryption model 76, the probabilities may change as more new data is received. That is, the dynamic input data 84 may include updated location data 80 and/or updated IoT data and may be used to allow the solution filter system 74 to collapse the expected passwords of the quantum encryption model 76 to fewer likely solutions. For instance, the dynamic input data 84 may include real time sensor measurements from the smart building sensors 26, the vehicle system 18, the smart home sensors 29, the smart mobile devices 48, the cameras 20, the traffic light 22, the wind sensor 38, or any other suitable device described above in FIG. 1, as well as those not detailed in FIG. 1.

The dynamic input data 84 may provide additional context to the solution filter system 74 to filter the unlikely expected outcomes from the quantum encryption model 76. That is, as more updated information becomes available from the various sources mentioned above, each of the simultaneously identified expected outcomes of the quantum encryption model 76 are associated with a changing probability of occurrence. By incorporating dynamic input data 84 with the quantum encryption model 76, the quantum computing system 12 may determine solutions or expected outcome in real time by collapsing on a solution that accounts for the simultaneously acquired data from the various data sources. In this way, notifications for individuals and devices may be provided in a timely (e.g., real time) manner, such that they may perform respective tasks thereafter.

In addition, the notifications may be provided to devices to allow the devices to notify users of the fraud alert 86 based on expected locations and IoT devices that may be within a proximity of the user. For instance, a fraud alert may be provided to the vehicle system 18 may cause the vehicle system 18 to output an audible notification of the alert to ensure that the user is aware of the potential fraud.

Figure 4:
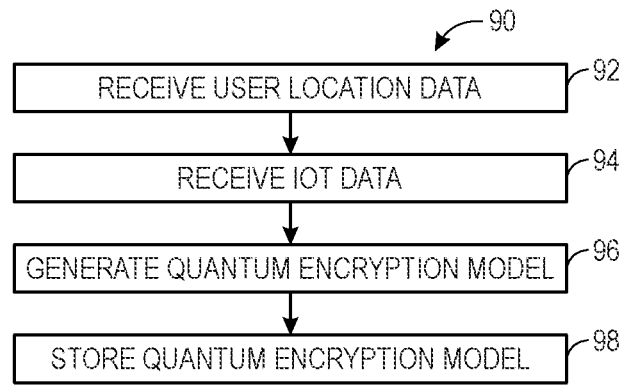
FIG. 4 is a flowchart of a method for generating a quantum encryption model based on internet-of-things (IoT) data and user location data, in accordance with aspects of the present disclosure.
Figure 5:
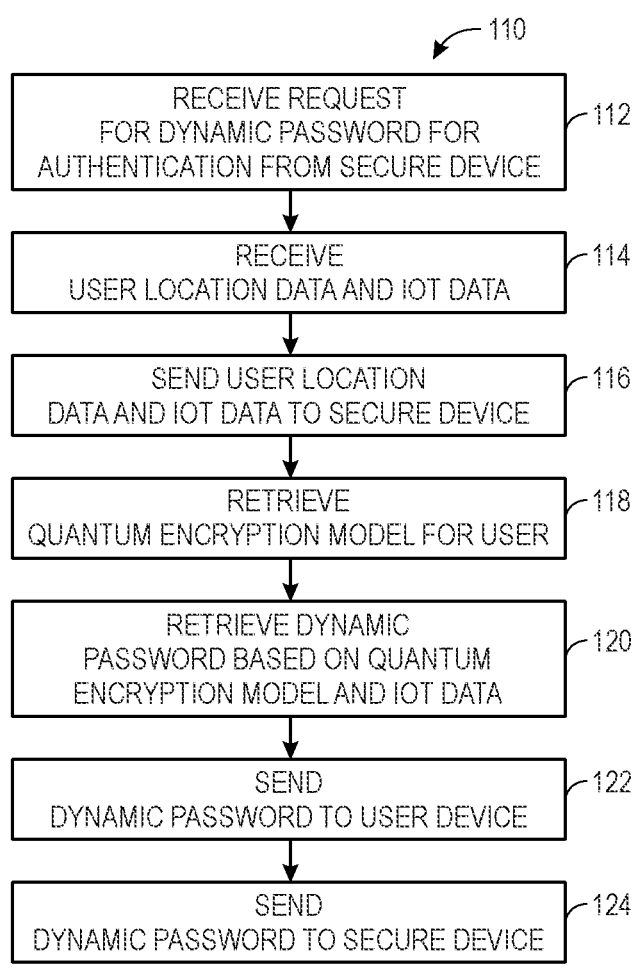
FIG. 5 is a flowchart of a method for providing dynamic passwords based on the quantum encryption model, in accordance with aspects of the present disclosure.

With the foregoing in mind, FIGS. 4 and 5 illustrate flow charts of a method 90 for generating the quantum encryption model 76 and a method 110 for sending the dynamic password 78 to a secure device. Although the following descriptions of the methods 90 and 110 are described in a particular order, it should be noted that the methods 90 and 119 may be performed in any suitable order. Additionally, although the methods 90 and 110 are described as being performed by the quantum computing system 12, it should be understood that any suitable quantum computing system may perform the methods 90 and 110.

Referring now to FIG. 4, at block 92, the quantum computing system 12 may receive the user location data 80. As discussed above, the user location data 80 may include information related to a current physical location of an individual. As such, the user location data 80 may be received from location sensors (e.g., GPS, location sensors), interpolated based on wireless signals (e.g., Wi-Fi signals, Bluetooth signals), and the like. In some embodiments, the user location data 80 may include location information over a period of time (e.g., day, week, month, months).

In addition to being acquired from sensors, the user location data 80 may also be inferred or determined based on data received from other devices described above in FIG. 1. For example, image data acquired by the camera 20 may be analyzed using facial recognition techniques to determine an identity of the individual and confirm a location of the individual based on this determination and the time in which the image data was acquired.

At block 94, the quantum computing system 12 may receive the IoT data 82 described above. As such, the quantum computing system 12 may receive data from any of the suitable sources described above in FIG. 1. The IoT data 82 may provide a data element that corresponds to the individual associated with the user location data 80. That is, an activity performed by the user may be tracked or detected as IoT data 82 and associated with the user based on the user location data 80 correlating to the source of the IoT data 82. In this way, the user's location information may be associated with other data to track the expected behavior and relationships with the user.

At block 96, the quantum computing system 12 may generate the quantum encryption model 76. The quantum encryption model 76 may apply one or more encryption algorithms to the various expected combinations between the user location data 80 and the IoT data 82. That is, the quantum encryption model 76 may include a plurality of processed outcomes for certain encryption algorithms that employ the user location data 80 and the IoT data 82 as inputs to determine the dynamic passwords 78. As discussed above, the quantum encryption model 76 may determine all of the possible dynamic passwords 78 based on the user location data 80 and the IoT data 82 in superposition. By way of example, depending on the user location data 80 and the type of data available in the IoT data 82, the quantum computing system 12 may perform a certain encryption algorithm (e.g., hash functions, symmetric-key algorithms, asymmetric-key algorithms, advanced encryption standards, rivest-shamir-adleman, triple data encryption standard, twofish) based on the available data. The quantum encryption model 76 may assume that each of the scenarios detected in the monitored data received at blocks 92 and 94 over time, as well as other possible scenarios, are occurring. As such, the quantum encryption model 76 may determine the dynamic passwords 78 for each possible scenario in superposition.

At block 98, the quantum computing system 12 may store the quantum encryption model 76 any suitable storage component. The quantum computing system 12 may retrieve the quantum encryption model 76 when performing the method 110 described below.

Referring to FIG. 5, the method 110 details a flow chart for generating sending the dynamic password 78 to another computing device. At block 112, the quantum computing system 12 may receive a request for the dynamic password 76. The request may be received from any suitable computing device or secure device. The secure device may be any suitable electronic device that uses some authentication process to perform some function. For example, the secure device may include the ATM device 50 that may seek authentication information before dispensing cash.

At block 114, the quantum computing system 12 may receive the user location data 80 and the IoT data 82 from any available device. The data received at block 114 may represent data acquired in real time or within a threshold amount of time (e.g., 5 minutes) of the request being received at block 112. As such, the data received at block 114 corresponds to the dynamic input data 84.

At block 116, the quantum computing system 12 may forward the user location data 80 and the IoT data 82 to the secure device. In this way, the quantum computing system 12 and the secure device may determine the dynamic password 76 using the same inputs.

At block 118, the quantum computing system 12 may retrieve the quantum encryption model 76 associated with the user. In some embodiments, the user location data 80 may include identification, the request for the dynamic password 76, or the like may include information (e.g., stored as metadata) that identifies the user, such as a user identification number, an account number, or the like. Using the user identification information, the quantum computing system 12 may identify and retrieve the quantum encryption model 76 associated with the user.

Using the quantum encryption model 76 and the dynamic input data 84, the quantum computing system 12 may, at block 120, converge to the dynamic password 78 that corresponds to the current situation or positioning of the user. As such, the dynamic password 78 may be a unique passphrase that is determined dynamically or in real time using the quantum computing system 12 and the quantum encryption model 76. In some embodiments, the quantum computing system 12 may use the solution filter system 74, as discussed above, to converge to the dynamic password 78 that corresponds to the current scenario of the user.

In some embodiments, the dynamic password 78 is determined based on a probability of the user being associated with a particular combination of the user location data 80 and the IoT data 82 at a particular time being greater than a threshold. That is, in some cases, the dynamic input data 84 may not match an observed combination of the user location data 80 and the IoT data 82 that is represented in the quantum encryption model 76. However, the quantum encryption model 76 may also include other scenarios (e.g., combinations) that may not be monitored but may have some likelihood or probability of occurring.

At block 122, the quantum computing system 12 may send the dynamic password 78 to the smart mobile device 48 or other suitable device. In some embodiments, the smart mobile device 48 may automatically execute or open an application that may present a visualization of the dynamic password 78. That is, the smart mobile device 48 may be operating in a low-power, sleep, or inactive mode and may be initialized in response to receiving the dynamic password 78.

At block 124, the quantum computing system 12 may send the dynamic password 78 to the secure device, such as the ATM device 50. The secure device may then, in turn, perform an operation or task (e.g., dispense funds) in response to receiving the dynamic password 48. In some embodiments, the secure device may use the user location data 80 and the IoT data 82 as inputs into the quantum encryption model 76 to retrieve the same dynamic password 76 provided to the secure device via the quantum computing system 12. In this way, the secure device may coordinate with the quantum computing system 12 to ensure that the user requesting the operation is authenticated.

By performing the embodiments described above, the quantum computing system 12 or other suitable computing system may efficiently determine the dynamic password 78 while employing fewer computing resources (e.g., memory, processing power) and can be completed in less time as compared to employing the respective encryption algorithm to the input data as described above.

In addition to generating the dynamic password 74, the quantum computing system 12 may also generate the fraud alert 86 based on a probability or likelihood that the user is performing or requesting to perform some action. That is, the quantum encryption model 76 provides information related to expected combination of input data (e.g., user location data 80 and IoT data 82) for a user over a period of time. As such, the quantum computing system 12 may cross reference the dynamic data 84 with the expected combination of input data provided in the quantum encryption model 76 to determine whether the user's current location and corresponding IoT data is consistent with the information provided in the quantum encryption model 76. That is, if the expected location and IoT data deviates from the actual location and IoT data by more than a threshold (e.g., standard deviation, predetermined level), the quantum computing system 12 may generate the fraud alert 86.

Figure 6:
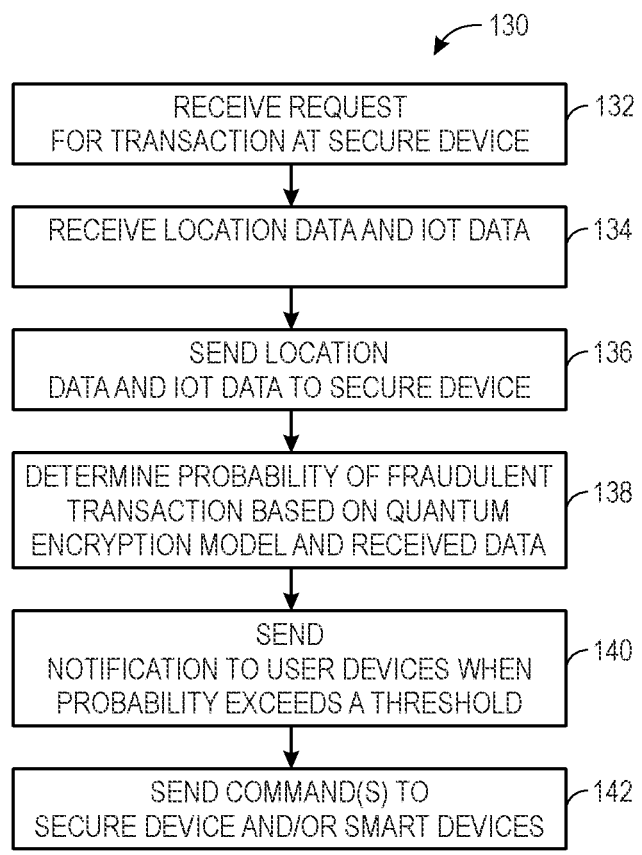
FIG. 6 is a flowchart of a method for providing notifications related to events expected to occur in a particular area based on combinatorial analysis of event data and data acquired from internet-of-things (IoT) data, in accordance with aspects of the present disclosure.

With the foregoing in mind, FIG. 6 illustrates a method 130 for sending the fraud alert 86 based on the quantum encryption model 76. Although the method 130 is described as being performed by the quantum computing system 12 and in a particular order, it should be noted that the method 130 may be performed by any suitable computing device in any suitable order.

Referring now to FIG. 6, blocks 132, 134, and 136 may correspond to the blocks 112, 114, and 116, respectively, of FIG. 5. That is, the quantum computing system 12 may receive a request for a transaction, receive the dynamic input data 84, and send the dynamic input data 84 to the secure device.

At block 138, the quantum computing system 12 may determine a probability of a fraudulent transaction request occurring based on the dynamic input data 84 received at block 134 and the quantum encryption model 74. That is, the quantum computing system 12 may evaluate the user location data and the corresponding IoT data that is provided in the dynamic input data 84, which corresponds to the current location and activity of the user, with respect to the expected location and IoT data for the user based on the user's location. In one example, the smart home sensors 29, such as a smart light, may indicate that certain activity (e.g., powered off) is performed on a particular day prior to the user traveling to a specific location to perform the transaction (e.g., purchasing coffee). If the request data and the dynamic input data 84 does not correspond to or differs by more than some threshold amount (e.g., greater than some distance and missing expected IoT data), the quantum computing system 12 may increase a fraud probability for the transaction requested at block 132. As the discrepancy between the expected location data and the expected IoT data provided in the quantum encryption model and the actual location and IoT data associated with the user increases, the quantum computing system 12 may increase the fraud probability.

In any case, the quantum computing system 12 may determine the probability that fraud is occurring using any suitable probability algorithm or methodology that accounts for the expected location data and the expected IoT data provided in the quantum encryption model with respect to the actual location and IoT data associated with the user provided in the dynamic input data 84.

At block 140, the quantum computing system 12 may send a notification to the smart mobile device 48 or other suitable device in response to the probability exceeding some threshold. In some embodiments, as the frequency of the detected discrepancies between the expected data combination and actual data combinations increase over some period of time, the quantum computing system 12 may also send the notification to the suitable device. As discussed above with respect to block 122, the notification may cause the recipient device to automatically execute an application regardless of the operating mode (e.g., active, inactive, low power, sleep) of the recipient device. The notification may provide a visual, audible, or haptic alert that may notify the respective user that a fraudulent transaction may be taking place.

In addition, at block 144, the quantum computing system 12 may send one or more commands to the secure device, such as the ATM device 50. The commands may include preventing or declining the performance of the transaction, activating image sensors to acquire image data of the individual attempting to make the transaction, or the like. Indeed, the command may include controlling any suitable device in the system 10, such that the individual that may be associated with the potential fraud may be prevented from performing additional fraud.

By performing the method 130, the present embodiments described herein detail an improved methodology to identify potential fraud transactions. Indeed, since the combination of the user location data 80 and the IoT data 82 may be tracked and stored by the quantum encryption model 76, the present embodiments provide a computationally efficient (e.g., using less computing memory and power) manner in which to determine a probability of a fraudulent transaction occurring. That is, the dynamic input data 84 may be efficiently compared to the input data represented in the quantum encryption model 76 to determine whether the dynamic input data 84 matches or is within a threshold amount of the expected data. Indeed, by accounting for the combination of user location data and IoT data within the quantum encryption model 76 and by employing the quantum computing system 12 to filter through the scenarios in superposition, the present embodiments provide improved technical solutions to determining the likelihood of a fraudulent transaction.

While only certain features of the embodiments described herein have been illustrated and described herein, many modifications and changes will occur to those skilled in the art. It is, therefore, to be understood that the appended claims are intended to cover all such modifications and changes as fall within the true spirit of the embodiments described herein. In addition, although the foregoing description is detailed as being performed by a quantum computer, it should be noted that classical processing and computer systems may perform the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving, via at least one qubit processor, input data comprising user location data associated with one or more locations of a user over a period of time and Internet-of-Things (IoT) data associated with the user over the period of time, wherein the IoT data is acquired by one or more sensors of a home assistant device, a smart vehicle, a biometric device, or any combination thereof;
generating, via the at least one qubit processor, a quantum encryption model based on the input data, wherein the quantum encryption model is configured to apply one or more encryption algorithms to a plurality of subsets of the input data in superposition, wherein each subset of the plurality of subsets comprise at least one combination of at least a portion of the user location data and at least a portion of the IoT data;
receiving, via the at least one qubit processor, additional input data comprising updated user location data and updated IoT data acquired after the input data, wherein the updated IoT data is acquired by the one or more sensors of the home assistant device, the smart vehicle, the biometric device, or any combination thereof;
determining, via the at least one qubit processor, a dynamic password based on the quantum encryption model and the additional input data; and
sending, via the at least one qubit processor, a notification comprising the dynamic password to a user device, wherein the notification is configured to cause the user device to present the dynamic password.

2. The method of claim 1, wherein the IoT data is acquired from a plurality of sensors comprising one or more smart building sensors, one or more wind sensors, one or more water sensors, one or more cameras, one or more speedometers, or any combination thereof.

3. The method of claim 1, comprising sending an additional notification comprising the dynamic password to a secure device.

4. The method of claim 3, wherein the secure device comprises an automated teller machine (ATM) device.

5. The method of claim 1, wherein the additional input data comprises real time data acquired from a plurality of sensors.

6. The method of claim 1, wherein the dynamic password is determined based on a solution filter applied to the quantum encryption model in view of the additional input data.

7. The method of claim 6, wherein the solution filter comprises Grover's algorithm.

8. A non-transitory quantum computer-readable medium comprising quantum-computer executable instructions that, when executed, cause at least one qubit processor to perform operations comprising:
receiving input data comprising user location data associated with one or more locations of a user over a period of time and Internet-of-Things (IoT) data associated with the user over the period of time, wherein the IoT data is acquired by one or more sensors of a home assistant device, a smart vehicle, a biometric device, or any combination thereof;
generating a quantum encryption model based on the input data, wherein the quantum encryption model is configured to apply one or more encryption algorithms to a plurality of subsets of the input data in superposition, wherein each subset of the plurality of subsets comprise at least one combination of at least a portion of the user location data and at least a portion of the IoT data;
receiving additional input data comprising updated user location data and updated IoT data acquired after the input data, wherein the updated IoT data is acquired by the one or more sensors of the home assistant device, the smart vehicle, the biometric device, or any combination thereof;
determining a dynamic password based on the quantum encryption model and the additional input data; and
sending a notification comprising the dynamic password to a user device, wherein the notification is configured to cause the user device to present the dynamic password.

9. The non-transitory quantum computer-readable medium of claim 8, wherein the quantum-computer executable instructions cause the at least one qubit processor to perform the operations comprising sending the input data to a secure device, wherein the secure device is configured to determine the dynamic password based on the quantum encryption model and the additional input data and authenticate the user based on the dynamic password.

10. The non-transitory quantum computer-readable medium of claim 8, wherein the quantum-computer executable instructions cause the at least one qubit processor to determine a probability of fraud based on the additional input data and the quantum encryption model.

11. The non-transitory quantum computer-readable medium of claim 10, wherein the quantum-computer executable instructions cause the at least one qubit processor to send an additional notification to a secure device in response to the probability of fraud exceeding a threshold.

12. The non-transitory quantum computer-readable medium of claim 11, wherein the additional notification is configured to cause the secure device to deny a transaction in response to the probability of fraud exceeding a threshold.

13. The non-transitory quantum computer-readable medium of claim 8, wherein the one or more sensors are disposed in a house.

14. The non-transitory quantum computer-readable medium of claim 8, wherein the user location data is acquired by the one or more sensors.

15. The non-transitory quantum computer-readable medium of claim 8, wherein the dynamic password is determined based on a solution filter applied to the quantum encryption model in view of the additional input data.

16. A system, comprising:
a plurality of sensors disposed in a geographic area; and
a quantum computing system configured to perform operations comprising:
receiving input data comprising user location data associated with one or more locations of a user over a period of time and Internet-of-Things (IoT) data associated with the user over the period of time, wherein the IoT data is acquired by one or more sensors of a home assistant device, a smart vehicle, a biometric device, or any combination thereof;
generating a quantum encryption model based on the input data, wherein the quantum encryption model is configured to apply one or more encryption algorithms to a plurality of subsets of the input data in superposition, wherein each subset of the plurality of subsets comprise at least one combination of at least a portion of the user location data and at least a portion of the IoT data;
receiving additional input data comprising updated user location data and updated IoT data acquired after the input data, wherein the updated IoT data is acquired by the one or more sensors of the home assistant device, the smart vehicle, the biometric device, or any combination thereof;
determining a dynamic password based on the quantum encryption model and the additional input data; and
sending a notification comprising the dynamic password to a user device, wherein the notification is configured to cause the user device to present the dynamic password.

17. The system of claim 16, wherein the notification is configured to cause the user device to generate one or more alerts configured to notify one or more users of the dynamic password.

18. The system of claim 16, wherein the dynamic password is determined based on a solution filter applied to the quantum encryption model in view of the additional input data.

19. The system of claim 18, wherein the solution filter comprises Grover's algorithm.

20. The system of claim 16, wherein the quantum computing system is configured to perform the operations comprising sending an additional notification to a secure device in response to a probability of fraud exceeding a threshold, wherein the probability of fraud is determined based on the additional input data and the quantum encryption model.

* * * * *